US010044132B2

United States Patent
Gagnon et al.

(10) Patent No.: US 10,044,132 B2
(45) Date of Patent: Aug. 7, 2018

(54) CABLE SEAL CONNECTOR WITH PUNCH-OUT CAPABILITY FOR UNUSED CAVITIES

(71) Applicant: YAZAKI NORTH AMERICA, INC., Canton, MI (US)

(72) Inventors: Jeremy Joseph Gagnon, Farmington, MI (US); Esther Charity Creswell, Ann Arbor, MI (US); Jonathan P. Miller, Farmington, MI (US)

(73) Assignee: YAZAKI NORTH AMERICA, INC., Canton, MI (US)

( * ) Notice: Subject to any disclaimer, the term of this patent is extended or adjusted under 35 U.S.C. 154(b) by 0 days.

(21) Appl. No.: 15/136,243

(22) Filed: Apr. 22, 2016

(65) Prior Publication Data
US 2017/0310040 A1   Oct. 26, 2017

(51) Int. Cl.
| H01R 13/52 | (2006.01) |
| F16J 15/06 | (2006.01) |
| H01R 13/428 | (2006.01) |
| H01R 43/20 | (2006.01) |

(52) U.S. Cl.
CPC .......... *H01R 13/5221* (2013.01); *F16J 15/06* (2013.01); *H01R 13/428* (2013.01); *H01R 43/20* (2013.01)

(58) Field of Classification Search
CPC .................................................. H01R 13/443
USPC ................................ 439/148, 587, 595, 150
See application file for complete search history.

(56) References Cited

U.S. PATENT DOCUMENTS

| 4,944,688 A * | 7/1990 | Lundergan ......... H01R 13/5221 439/275 |
| 4,973,268 A | 11/1990 | Smith et al. |
| 5,451,717 A | 9/1995 | Itou |
| 5,551,892 A * | 9/1996 | Endo .................... H01R 13/443 439/587 |
| 5,628,656 A | 5/1997 | Macioce et al. |
| 5,634,807 A | 6/1997 | Saito |
| 5,707,251 A * | 1/1998 | Sakai ................. H01R 13/5208 439/274 |
| 6,186,829 B1 | 2/2001 | Murakami et al. |

(Continued)

FOREIGN PATENT DOCUMENTS

| EP | 0964482 A1 | 12/1999 |
| FR | 2747846 A1 | 10/1997 |

OTHER PUBLICATIONS

Extended European Search Report dated Sep. 6, 2017 for EP Application No. 17167073.0 (11 pages).

*Primary Examiner* — Tulsidas C Patel
*Assistant Examiner* — Marcus Harcum
(74) *Attorney, Agent, or Firm* — RMCK Law Group, PLC

(57) ABSTRACT

A cable seal connector assembly includes an outer housing having a sealing area with a plurality of terminal insertion cavities configured to receive a wire and a cable seal of an electrical connection. The cable seal is disposed about the wire and configured to seal one terminal insertion cavity of the plurality of terminal insertion cavities. At least one terminal insertion cavity of the plurality of terminal insertion cavities includes a molded member integrally formed within the terminal insertion cavity when the outer housing is formed. The molded member is configured to seal the terminal insertion cavity, and the molded member configured to be removed from the terminal insertion cavity.

11 Claims, 3 Drawing Sheets

(56) References Cited

U.S. PATENT DOCUMENTS

| | | | |
|---|---|---|---|
| 6,196,872 B1 | 3/2001 | Murakami et al. | |
| 6,247,965 B1* | 6/2001 | Cummings | H01R 13/4223 439/148 |
| 6,309,252 B1 | 10/2001 | Murakami et al. | |
| 6,341,983 B1 | 1/2002 | Crawford et al. | |
| 6,468,113 B1* | 10/2002 | Murakami | H01R 13/4364 439/274 |
| 6,494,740 B1 | 12/2002 | Murakami et al. | |
| 6,752,659 B2 | 6/2004 | Nakamura et al. | |
| 7,481,675 B2* | 1/2009 | Patterson | H01R 13/5205 439/148 |
| 7,722,414 B2* | 5/2010 | Tanaka | H01R 13/4365 439/595 |
| 7,727,016 B2 | 6/2010 | Lamdiziz et al. | |
| 7,758,378 B2* | 7/2010 | Yoshida | H01R 13/41 439/587 |
| 8,100,716 B2 | 1/2012 | Yahya et al. | |
| 8,241,061 B2* | 8/2012 | Chazottes | H01R 13/5205 439/272 |
| 8,337,244 B2 | 12/2012 | Sawamura | |
| 8,647,132 B2 | 2/2014 | Kuroda et al. | |
| 8,662,921 B2* | 3/2014 | Kataoka | H01R 13/443 439/148 |
| 9,106,000 B2 | 8/2015 | Mizutani et al. | |
| 2001/0046803 A1* | 11/2001 | Kodama | H01R 13/6273 439/357 |
| 2002/0111071 A1* | 8/2002 | Pade | G01N 27/4062 439/620.21 |
| 2003/0157833 A1* | 8/2003 | Tsuji | H01R 13/4223 439/595 |
| 2007/0232140 A1 | 10/2007 | Tyler | |
| 2008/0305664 A1* | 12/2008 | Shishikura | H01R 13/443 439/148 |
| 2011/0171856 A1* | 7/2011 | Tyler | H01R 13/648 439/607.52 |
| 2014/0065865 A1 | 3/2014 | Mizutani et al. | |

* cited by examiner

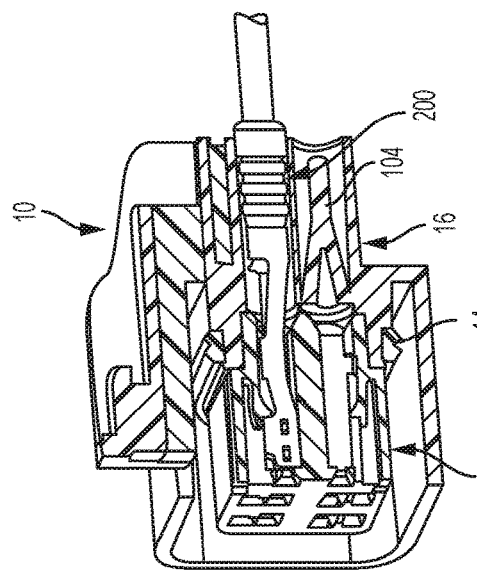
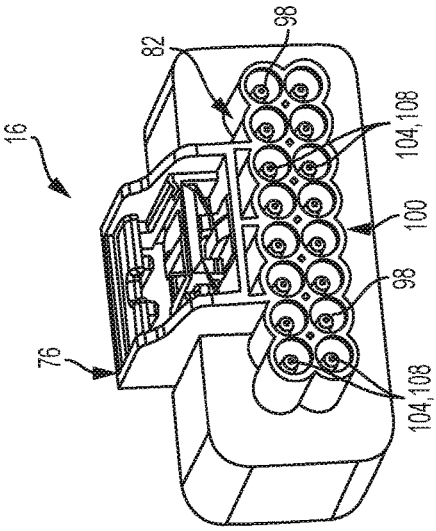
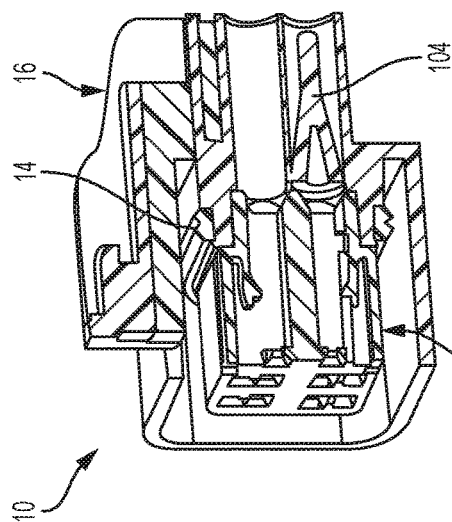
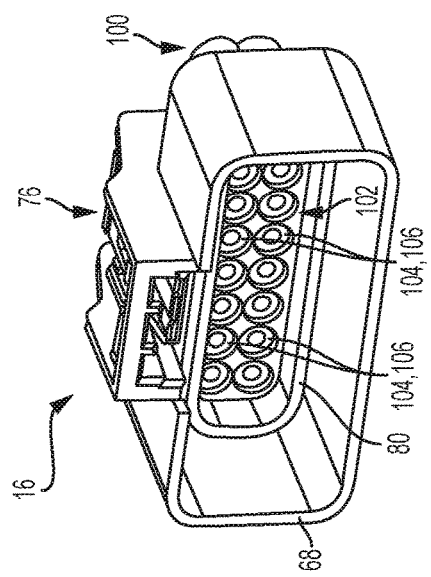

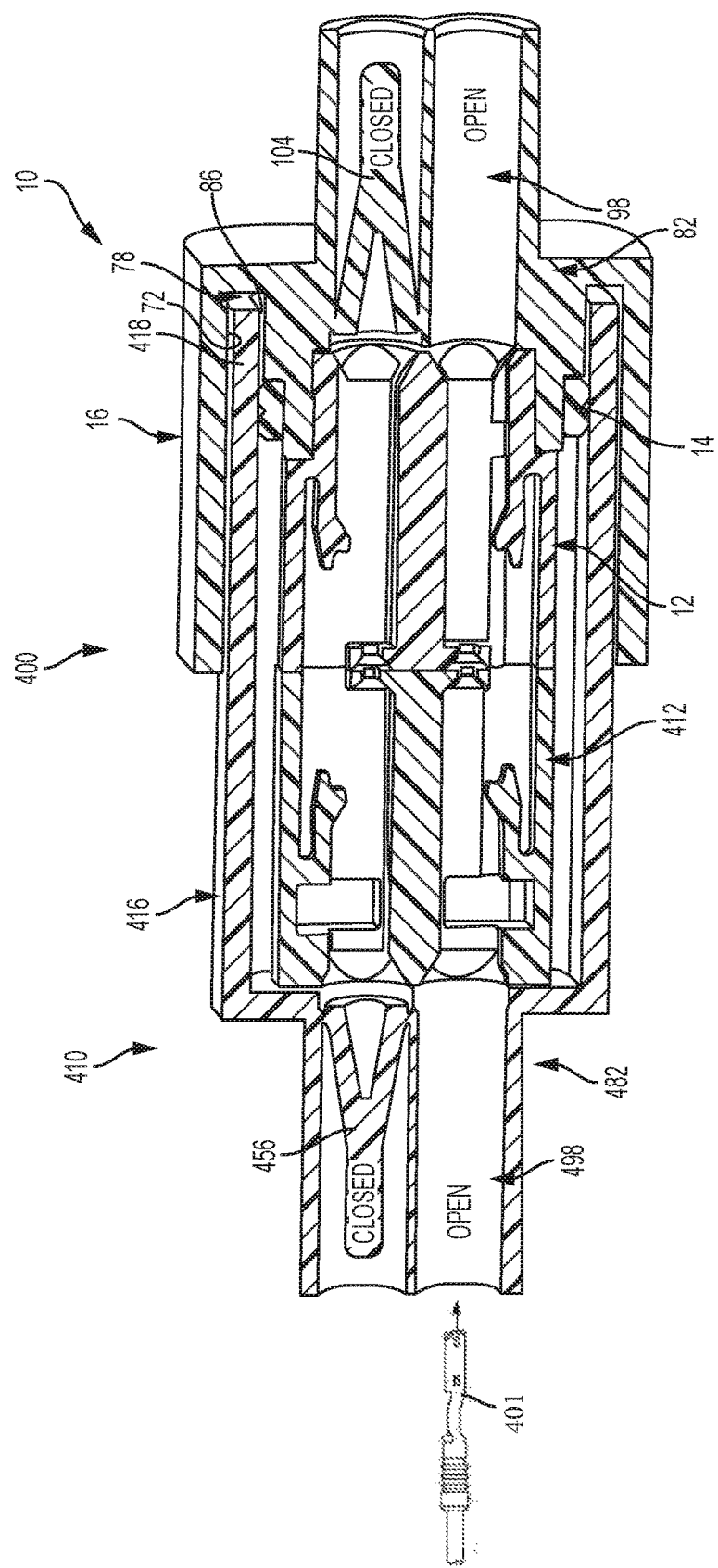

CABLE SEAL CONNECTOR WITH PUNCH-OUT CAPABILITY FOR UNUSED CAVITIES

FIELD

The present disclosure relates to electrical connections between two electrical components and, more particularly, to a cable seal connector assembly having punch-out capability for unused cavities.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional multiple contact connectors typically include a plurality of contacts and an insulating housing having several openings or inserting slots on a rear face that is opposite to a front face, which couples to a corresponding connector. Some connectors need to be protected against environmental influences such as dirt and moisture. As such, sealing may be provided at the openings in the rear face of the housing in the form of a block or mat seal, which is fabricated from an elastic material and includes a plurality of openings through which electrical contacts are plugged through or pierced through when assembling the electrical connector.

However, the mat seal configuration may be problematic for very thin cables having a diameter that is substantially smaller than transverse dimensions of the contact, because the mat seal openings can only be stretched to a certain extent when inserting the contacts. Moreover, there is a risk that the mat seal is damaged when the contacts are pierced through. This is particularly problematic if the outer dimensions of the contacts are substantially larger than the cable diameter, if the contact has sharp features, or if the contact is stamped so that the edges of the contact may have burrs which can damage portions of the mat seal that come into contact with these edges. Cuts and tears in the mat seal compromise its sealing performance.

Instead of providing a single common mat seal for all contacts, each contact may be individually fitted with a cable seal before inserting the contact into the housing. This is particularly advantageous for very small cable insulation diameters because the contact itself does not need to pass through the cable seal aperture.

Typical cable sealed connectors require a loose-piece cavity plug for any cavities that are not used in a connector. These loose-piece plugs must be assembled to an optimal position or depth in each unused cavity to prevent water pooling or to prevent the plug from falling out of the cavity. It may be difficult to achieve this optimal position in a wire harness assembly, which can lead to quality issues if the plug falls out.

It is possible to "flash over" connector cavities instead of using cavity plugs. However, this requires physical changes to the mold cores and connector production must be stopped to perform the change-over in the mold tooling. Furthermore, some cavities cannot be flashed over as they contain necessary features for terminal position assurance (TPA) locking that requires tool access.

Accordingly, while such conventional connector assemblies work for their intended purpose, it is desirable to provide an improved system for sealing unused cavities of a connector assembly that utilizes individual cable seals as opposed to a mat seal.

SUMMARY

In various embodiments of the present disclosure, a cable seal connector assembly is disclosed. The cable seal connector assembly includes an outer housing having a sealing area with a plurality of terminal insertion cavities configured to receive a wire and a cable seal of an electrical connection. The cable seal is disposed about the wire and configured to seal one terminal insertion cavity of the plurality of terminal insertion cavities. At least one terminal insertion cavity of the plurality of terminal insertion cavities includes a molded member integrally formed within the terminal insertion cavity when the outer housing is formed. The molded member is configured to seal the terminal insertion cavity, and the molded member configured to be removed from the terminal insertion cavity.

In various embodiments of the present disclosure, a wire harness assembly is disclosed. The assembly includes a first cable seal connector assembly including a first electrical connection having a wire coupled to a terminal fitting and an individual cable seal disposed about the wire, a first inner housing having a plurality of terminal housing chambers configured to receive the terminal fitting of the first electrical connection, and a first outer housing having a sealing area with at least one sealed terminal insertion cavity and at least one open terminal insertion cavity. The at least one open terminal insertion cavity is associated with one of the terminal housing chambers and is configured to receive the wire and the cable seal of the first electrical connection, the cable seal being disposed within the open terminal insertion cavity to provide sealing therein about the wire. The at least one sealed terminal insertion cavity includes a molded member integrally formed therein when the first outer housing is formed. The molded member is configured to seal the sealed terminal insertion cavity, and the molded member is configured to be removed from the sealed terminal insertion cavity to enable insertion of the first electrical connection therein into an associated terminal housing chamber.

In various embodiments of the present disclosure, a method of manufacturing a cable seal connector assembly is disclosed. The method includes forming an outer housing having a sealing area with a plurality of terminal insertion cavities configured to receive a wire and a cable seal configured to seal one terminal insertion cavity of the plurality of terminal insertion cavities, and integrally forming a molded plug in at least one of the terminal insertion cavities when the outer housing is formed, the molded plug sealing the terminal insertion cavity.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is sectional view of the cable seal connector assembly shown in FIG. 1 and partially assembled, according to some implementations of the present disclosure;

FIG. 3 is a sectional view of the cable seal connector assembly shown in FIGS. 1 and 2 after assembly, according to some implementations of the present disclosure;

FIG. 4 is a front perspective view of an example cable seal connector housing of the assembly shown in FIGS. 1-3 according to some implementations of the present disclosure;

FIG. 5 is a rear perspective view of the example cable seal connector housing of FIG. 4; and FIG. 6 is a sectional view of an example wire harness assembly having the cable seal connector assembly shown in FIGS. 1-3 according to some implementations of the present disclosure.

DETAILED DESCRIPTION

Figure 1:
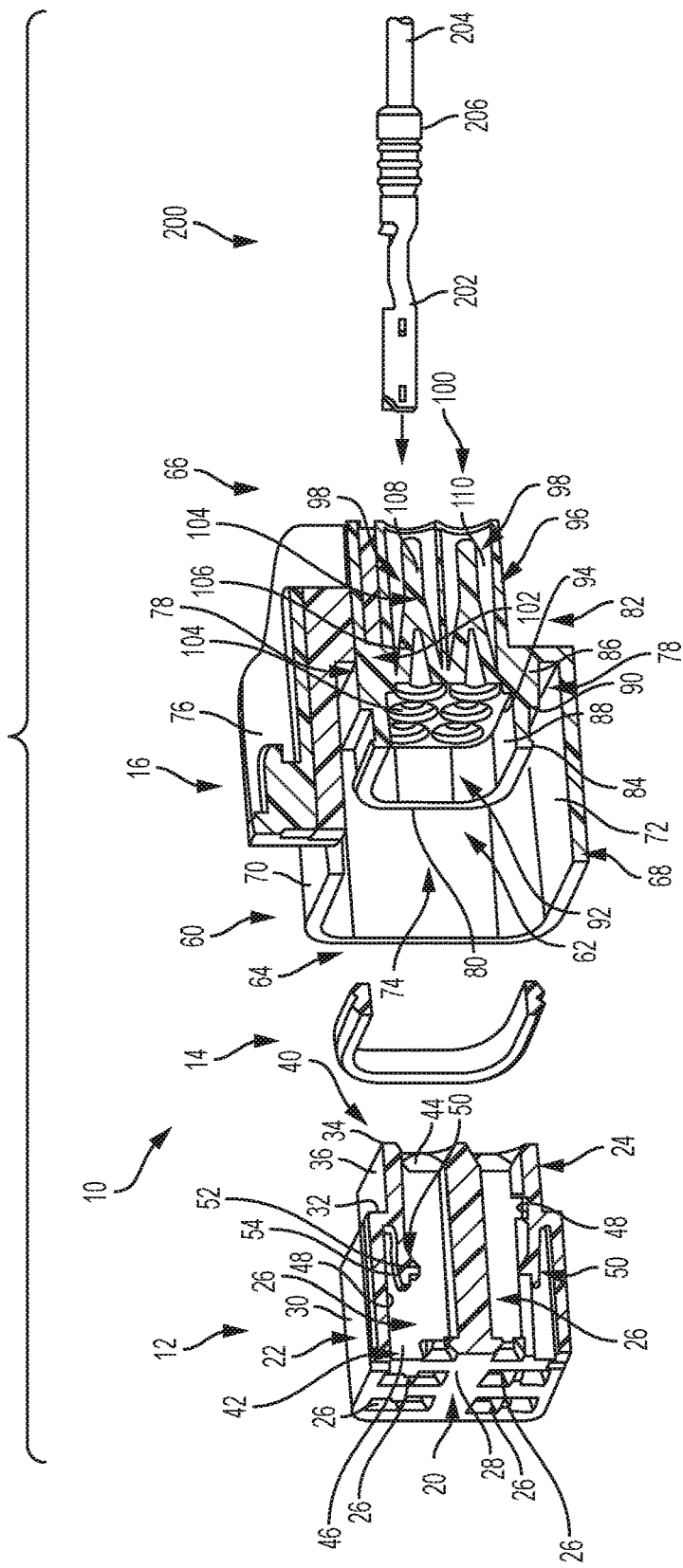
FIG. 1 is a sectional view of an example cable seal connector assembly before assembly, according to some implementations of the present disclosure.

FIGS. 1-3 illustrate an example cable seal connector assembly 10. FIG. 1 illustrates the cable seal connector assembly 10 before assembly, FIG. 2 illustrates the cable seal connector assembly 10 partially assembled and after a plug removal process, and FIG. 3 illustrates the cable seal connector assembly 10 after assembly. In the illustrated embodiment, cable seal connector assembly 10 is configured to receive and house an electrical connection 200 and generally includes an inner housing 12, a seal 14, and an outer housing 16. In the example embodiment, electrical connection 200 includes a terminal fitting 202 to which an electric wire 204 and a rubber cable seal 206 are attached (see FIGS. 1 and 3).

Inner housing 12 generally includes a housing body 20 defining a main body portion 22, a connecting portion 24, and a plurality of terminal housing chambers 26 formed integrally therein. Main body portion 22 includes a front surface 28, an outer surface 30, and a rear surface defining a shoulder 32 adjacent the connecting portion 24. The connecting portion 24 includes a rear surface 34 and an outer surface 36, and is configured to be inserted into outer housing 16. Inner housing 12 may include one or more connecting features (not shown) configured to couple inner housing 12 to outer housing 16.

Each terminal housing chamber 26 includes a terminal insertion end 40 at the insertion portion rear surface 34, and a terminal receiving end 42 at the main body portion front surface 28. Each terminal insertion end 40 includes a terminal insertion opening 44 configured to receive one electrical connection 200. Each terminal receiving end 42 includes a terminal receiving opening 46 configured to receive a complementary terminal (not shown) that is configured to be electrically coupled to the associated electrical connection 200.

In the example embodiment, each terminal housing chamber 26 includes an inner peripheral wall 48, which may include one or more retention member 50 extending therefrom and configured to retain terminal fitting 202. For example, in the illustrated embodiment, the retention member is a flexible retention arm 50 extending from inner peripheral wall 48 and including a retaining protrusion 52 and a releasing protrusion 54.

Seal 14 is a waterproof packing interposed between outer housing 16 and an opponent connector assembly 410 (FIG. 6) when the opponent connector is inserted into outer housing 16. Seal 14 is configured to be attached to the outer housing 16 from a front side of the outer housing 16.

With additional reference to FIGS. 4 and 5, outer housing 16 generally includes an outer portion 60, an inner portion 62, a housing front side 64, and a housing rear side 66. Outer portion 60 includes an outer wall 68 having an outer surface 70 and an inner surface 72. Outer wall 68 at least partially defines a cavity 74 configured to receive an opponent connector. Alternatively, outer housing 16 may be configured to be received within the opponent connector.

Outer surface 70 includes one or more retention features 76, such as the illustrated retention clip, configured to mate with a complementary retention feature of an opponent connector (not shown) for securing cable seal connector assembly 10 thereto. A receiving channel 78 is defined between inner surface 72 and inner portion 62, and is configured to receive an insertion portion of an opponent connector. For example, as shown in FIG. 6, channel 78 receives an insertion portion 418 of a connector 410.

Inner portion 62 includes an inner wall 80 and a sealing area 82. Inner wall 80 includes a first outer surface 84, a second outer surface 86, and an inner surface 88. The seal 14 is configured to be seated on first outer surface 84 and abut against a shoulder 90 defined between the first outer surface 84 and the second outer surface 86. As shown in FIG. 6, at least a portion of opponent connector insertion portion 418 is disposed against second outer surface 86 in the receiving channel 78 to rigidly secure connector assembly 10 and the opponent connector 410. Inner surface 88 defines a housing receiving cavity 92 configured to receive the connecting portion 24 of inner housing 12 such that inner housing rear surface 34 abuts against a shoulder 94 defined between inner surface 88 and sealing area 82.

Sealing area 82 includes a body 96 having a plurality of terminal insertion cavities 98 formed between an input end 100 and an output end 102. Terminal insertion cavities 98 each have a circular or substantially circular cross-section and are configured to receive one of the electrical connections 200. However, each terminal insertion cavity 98 of the outer housing 16 includes a molded plug 104 that is integrally molded therein. For example, outer housing 16 is fabricated using an injection molding process that integrally forms molded plugs 104 within each terminal insertion cavity 98. As such, the electrical connection 200 cannot be inserted through cavity 98 until plug 104 is removed.

As shown in FIG. 1, molded plug 104 includes an attachment portion 106 and a removal contact portion 108. Attachment portion 106 is generally conical and is integrally molded to an inner peripheral surface 110 of insertion cavity 98. Removal contact portion 108 is generally cylindrical and extends from attachment portion 106 within insertion cavity 98. Removal contact portion 108 is configured to be contacted by a tool or machine (not shown) to remove or punch out the molded plug 104. Accordingly, once fabricated, the outer housing 16 may undergo a punch-out process where the tool or machine removes molded plugs 104 from specific terminal insertion cavities 98 that will receive an electrical connection 200.

As such, outer housing 16 includes sealing area 82 for cable seals 206 and is molded with each cavity 98 in the completely closed position by molded plugs 104. Outer housing 16 may undergo an automated process to punch out the molded plugs 104 in cavities 98 that will accept wires 204 and cable seals 206. The un-punched cavities will remain sealed and closed by the molded plugs 104 and will not require a loose-piece cavity plug (not shown). As such, assembly 10 eliminates the need for potentially problematic loose-piece cavity plugs for unused cavities, and does not require complex and lengthy tool changes to the connector mold. Further, assembly 10 does not utilize a mat seal and instead utilizes individual cable seals 206 that provide more robust sealing when compared to mat sealed connectors.

Once molded plugs 104 are removed from the desired terminal insertion cavities 98, electrical connection 200 is connected to assembly 10 by inserting terminal fitting 202 into input end 100 and through terminal insertion cavity 98 into the terminal housing chamber 26. As shown in FIG. 3, terminal fitting 202 is secured within chamber 26 by retention member 50, and cable seal 206 is disposed within terminal insertion cavity 98, thereby sealing cavity 98 from input end 100.

In one embodiment, an example method 300 of manufacturing cable seal connector assembly 10 includes forming inner housing 12 at step 310, for example, by an injection molding process. At step 320, outer housing 16 is formed with a sealing area 82 having a plurality of terminal insertion cavities 98, for example, by an injection molding process. Plugs 104 are integrally formed in the terminal insertion cavities 98 during formation of the outer housing 16, such that outer housing 16 is formed with all cavities 98 in a sealed condition. At step 330, a removal or punching process is subsequently performed on the outer housing 16 to remove molded plugs 104 from terminal insertion cavities 98 that will receive an electrical connection 200.

At step 340, seal 14 is seated on outer housing 16. At step 350, inner housing 12 is inserted into outer housing 16 and coupled thereto. At step 360, electrical connection 200 is inserted through terminal insertion cavity 98 and into terminal housing chamber 26 such that terminal fitting 202 is disposed and secured within chamber 26 (e.g., by retention member 50) and cable seal 206 is disposed within and seals insertion cavity 98 about wire 204.

With reference to FIG. 6, an example wire harness connector assembly 400 is illustrated. Wire harness assembly 400 generally includes cable seal connector assembly 10 and an opponent cable seal connector assembly 410. In the illustrated embodiment, cable seal connector assembly 10 is a female connector and opponent connector assembly 410 is a male connector.

Opponent connector assembly 410 includes an inner housing 412 received within an outer housing 416. Inner housing 412 is configured to receive an electrical connection (e.g., 401, shown in FIG. 6) with a terminal configured to electrically connect to terminal fitting 202. Outer housing 416 includes an outer wall or insertion portion 418 configured to be received within receiving channel 78 between inner surface 72 and second outer surface 86. Seal 14 is interposed between outer housing 16 and outer housing 416 to sealingly secure connector assembly 10 and opponent connector assembly 410. Outer housing 416 may be formed with a sealing area 482 that includes integrally molded plugs 456 within terminal insertion cavities 498. Sealing area 482 is similar to sealing area 82 and molded plugs 456 may be selectively removed in a similar manner.

Described herein are systems and methods for sealing terminal cavities of a cable sealed connector assembly. The cable sealed connector assembly includes separately molded inner and outer housings. The inner housing retains the electrical terminals and a TPA device (not shown). The outer housing includes terminal insertion cavities for a cable seal that are molded in the completely closed position by a molded plug. A process may then be performed to punch the integrally molded plugs out of the cavities that will receive electrical terminals. The un-punched cavities will remain closed by the integrally molded plugs and will not require a loose-piece cavity plug. As such, the cable sealed connector assembly provides a connector that eliminates the need for loose-piece cavity plugs for unused cavities, does not require complex and lengthy tool changes to the connector mold for flash-over, and provides superior sealing capabilities with individual cable seals as opposed to connectors with mat seals.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wire harness connector assembly, comprising:
a first cable seal connector assembly comprising:

a first electrical connection having a wire coupled to a terminal fitting and an individual cable seal disposed about the wire;

a first inner housing having a plurality of terminal housing chambers configured to receive the terminal fitting of the first electrical connection; and a first outer housing having a sealing area with one or more sealed terminal insertion cavities and one or more open terminal insertion cavities, each of the one or more open terminal insertion cavities associated with one of the terminal housing chambers and configured to receive the wire and the cable seal of the first electrical connection, the cable seal disposed within the open terminal insertion cavity to provide sealing therein about the wire, wherein:
 each of the one or more sealed terminal insertion cavities includes a molded member integrally formed therein when the first outer housing is formed,
 each molded member is configured to seal its corresponding sealed terminal insertion cavity,
 each molded member is configured to be removed from the sealed terminal insertion cavity to enable insertion of the first electrical connection therein into an associated terminal housing chamber,
 each of the one or more sealed terminal insertion cavities is sealed by the molded member, and
 each of the one or more open terminal insertion cavities is sealed by the cable seal of the inserted electrical connection, and a second cable seal connector assembly configured to be coupled to and received within the first cable seal connector assembly, the second cable seal connector assembly comprising:

a second electrical connection having a wire coupled to a terminal and an individual cable seal disposed about the wire, the second electrical connection configured to electrically couple to the first electrical connection;

a second inner housing having a plurality of terminal housing chambers configured to receive the terminal of the second electrical connection; and a second outer housing having a sealing area with one or more sealed terminal insertion cavities and one or more open terminal insertion cavities, each of the one or more open terminal insertion cavities associated with one of the terminal housing chambers and configured to receive the wire and the cable seal of the second electrical connection, the cable seal disposed within the open terminal insertion cavity to provide sealing therein about the wire, wherein:
 each of the one or more sealed terminal insertion cavities includes a molded member integrally formed therein when the second outer housing is formed,
 each molded member is configured to seal its corresponding sealed terminal insertion cavity,
 each molded member is configured to be removed from the sealed terminal insertion cavity to enable insertion of the second electrical connection therein and into an associated terminal housing chamber,
 each of the one or more sealed terminal insertion cavities is sealed by the molded member, and
 each of the one or more open terminal insertion cavities is sealed by the cable seal of the inserted electrical connection.

2. The assembly of claim 1, wherein the cable seal connector assembly does not include a mat seal having a plurality of openings to receive a plurality of electrical wires.

3. The assembly of claim 1, wherein the individual cable seal of the first electrical connection is only disposed about the wire of the first electrical connection.

4. The assembly of claim 1, wherein each molded member of the first outer housing is a plug including an attachment portion coupled to an inner peripheral wall of the terminal insertion cavity, and a removal contact portion extending from the attachment portion, the removal contact portion configured to be engaged by a plug removal device.

5. The assembly of claim 4, wherein the attachment portion is conical and the removal contact portion is cylindrical.

6. The assembly of claim 4, wherein the terminal insertion cavity includes an input end where the electrical connection is initially inserted, and an output end adjacent to the inner housing, the attachment portion coupled to the inner peripheral wall at the output end.

7. The assembly of claim 1, further comprising a seal disposed within the first outer housing, wherein the outer housing includes an outer wall and an inner wall, the seal being disposed about an outer surface of the inner wall and configured to provide sealing engagement between the first outer housing and second cable seal connector assembly.

8. The assembly of claim 7, wherein the outer surface of the inner wall comprises a first outer surface offset from a second outer surface, wherein the seal is disposed about the first outer surface, and wherein the second outer surface and the outer wall define a receiving channel therebetween configured to receive an insertion portion of the second cable seal connector assembly.

9. The assembly of claim 1, wherein each terminal housing chamber of the plurality of terminal housing chambers of the first inner housing includes a retention member configured to engage the terminal fitting to retain the terminal fitting in the terminal housing chamber.

10. The assembly of claim 9, wherein the retention member is a flexible arm extending from an inner peripheral wall of the terminal housing chamber.

11. The assembly of claim 10, wherein the flexible arm includes a retaining protrusion and a releasing protrusion.

* * * * *